Patented Aug. 5, 1941

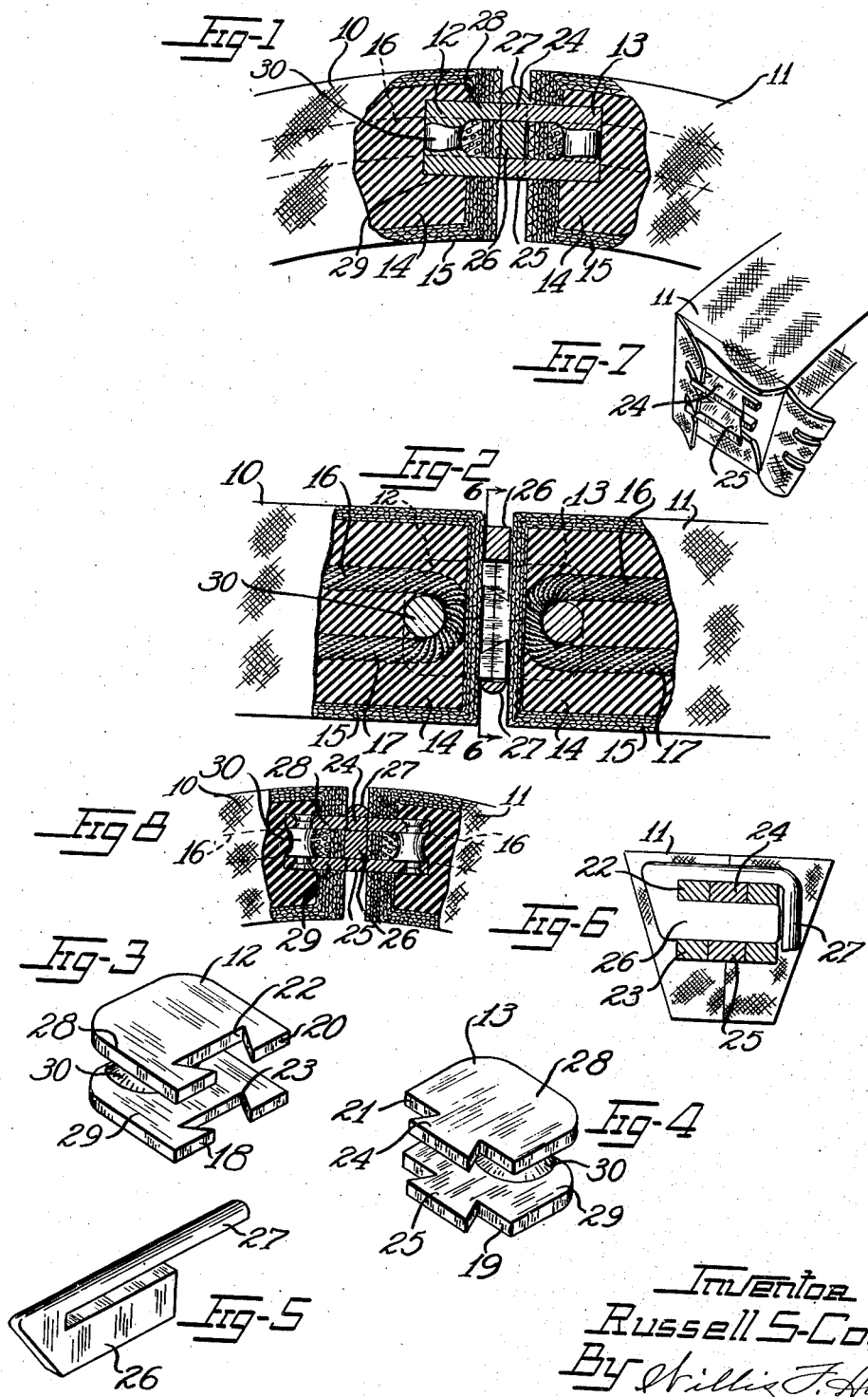

2,251,400

UNITED STATES PATENT OFFICE 2,251,400

FASTENING STRIP MATERIAL

Russell S. Colley, Kent, Ohio, assignor to The B. F. Goodrich Company, New York, N. Y., a corporation of New York Application March 30, 1939, Serial No. 264,938

11 Claims. (Cl. 24—38)

This invention relates to fastening strip material and is especially useful where lengths of flexible belting or other strip material are to be connected to each other.

The joining of strip material of a flexible nature such as belting for transmission purposes, where the fastener must sustain a load equal to that of the belt, without obstructing the working surface of the belt, presents a difficult problem. In fastener constructions heretofore proposed the belt ends often have been unduly stiffened and obstructed, the presence of moving parts has necessitated undesirable lubrication, and accidental separation of the belt ends has been likely. The present invention provides for overcoming these and other difficulties.

The principal objects of the invention are security of fastening, nonobstruction of the working faces of the belt, strength, independence of lubrication, simplicity of construction, uniform flexibility of the coupled belt, and ease of attachment.

These and other objects will appear from the following description and the accompanying drawing.

Of the drawing:

Fig. 1 is a side elevation, partly broken away and partly in section, of a pair of belt ends connected by the fastener of this invention in its preferred form.

Fig. 2 is a plan view of the same, partly broken away and partly in section.

Fig. 3 is a perspective view of one of the fastener elements.

Fig. 4 is a similar view of the complementary fastener element.

Fig. 5 is a perspective view of the locking key.

Fig. 6 is a sectional view, taken on line 6—6 of Fig. 2 showing the position of the locking key when clinched in place.

Fig. 7 is a perspective view of an end of a belt during construction of the same, illustrating how the fabric cover of the belt is folded in place over one of the fastener members.

Fig. 8 is a view similar to Fig. 1 showing a modification.

Referring to the drawing, the numerals 10, 11 designate contiguous ends of flexible belt members or the opposite ends of a single flexible belt member held in contiguous relation against hinging movement by relatively inflexible fastening or coupling elements 12, 13 of short extent in the direction of travel of the belt and attached to the respective ends of the belt. The belt may be of any desired construction but is shown as having a body 14 of resilient rubber or other rubber-like composition, a cover 15 comprising a plurality of layers of rubberized fabric, and reaches 16, 17 of reinforcing cord or cords, or other members adapted to sustain tensional forces, embedded in the body at the neutral zone thereof and attached to the fastener elements 12, 13.

In the preferred form of the invention, 16, 17 are parallel reaches of a single link or grommet of endless material such as cord, wire cable, chain, wire, or other strength supplying flexible material looped about portions of the fastener elements, or may be loops of such material about such elements and having their ends extending along the belt a considerable distance to provide sufficient anchorage. However, single tension members or a plurality thereof may extend along the belt and be anchored to the fastener elements by being knotted thereto or looped thereabout or clamped thereto in any desired manner. The fastener elements are made as short as possible in order that only a minimum portion of the length of the belt will be stiffened thereby, and, in the preferred construction, these elements are embedded in the material of the belt and may be secured thereto by vulcanization.

The fastener elements are provided with abutting faces 18, 19, 20, 21, adapted to be interlocked or interengaged with each other, as by having dove-tailed mortices 22, 23 and tenons 24, 25 formed thereon so that they may be engaged by movement in a direction other than in the direction of travel of the belt and cannot be disengaged by normal pull in the direction of travel of the belt. The interengaging parts are made of sufficient strength to at least equal the strength of the belt itself.

In the preferred form of the invention, the fastener elements are adapted for disengagement by relative movement at right angles to the direction of travel of the belt. Accidental disengagement of the fastener elements may be prevented by a locking key or cotter preventing movement in the regular direction of detachment. A convenient key for this purpose is illustrated in Fig. 5, and comprises a key body 26 adapted to fit between adjoining ends of the belt and the respective mortice and tenoned portions of the fastener elements. While the key may be locked in place by an ordinary cotter pin passed through a hole therein, the key illustrated in Fig. 5 has a locking member 27 formed integral therewith. After the key is in place, the locking member may be bent as shown in Fig. 6 so as to retain the key in place.

Where the fastener elements are to be attached to a belt having an endless grommet or retaining loops of flexible material molded therein, the fastener elements may each be formed of a pair of plate members 28, 29 held in parallel spaced relation by a round post 30 about which the flexible material may be looped, while the spaced relation of the plates provides a convenient space therebetween for receiving the locking key. The spaced plates and the post may be made of one piece of metal or other material, or the plates may be made separate and secured to the post as shown in Fig. 8.

Where the fastener elements are molded into the belt ends, the fabric covering of the belt is preferably folded about the fastener element as shown in Fig. 7 before the belt is molded, the material being cut to provide flaps which are folded over the ends of the belt, the flaps being notched to permit the interengaging portions of the fastener element to protrude.

Such a belt fastening as is herein described draws the belt ends into close relation so as to require little gap between them and occupies such a small extent of the belt as not to interfere substantially with the flexibility of the belt, while the fastener elements are held tightly together without hinging action and therefore require no lubrication. The belt ends are readily secured to each other by a simple movement in a direction normal to the direction of travel of the belt and carry the full load of the belt. The single fastener is particularly useful in connection with the fastening of side-driving V-belts or other belts of slight width. With wide belts one or a pluraltiy of the fasteners may be used. The locking key holds the fastener elements securely against accidental detachment without sustaining the tension load on the belt and is entirely located between the ends of the belt without protruding above the faces of the belt.

Modification may be made without departing from the scope of the invention as it is defined by the following claims.

I claim:

1. A belt joint comprising a pair of flexible belt ends each having a fastener element of rigid material embedded therein and protruding from the end faces of said belt ends, interengaging means on said elements slidably engageable with each other in a direction lateral of the belt to lock them against hinging movement, and means for locking said means against sliding movement with relation to each other.

2. A belt joint comprising a pair of flexible belt ends each having a rigid fastener element engaging with tension elements of the belt ends, interengaging means on said fastener elements for holding them together in abutting relation without hinging movement and permitting separation thereof by relative movement in a direction lateral to the direction of travel of the belt, and means for locking the elements against such relative movement.

3. A belt joint comprising a pair of belt ends each having a tension element therein disposed in a loop closely adjacent the end face of the belt end, post elements disposed in said loops and wholly embedded in the belt ends, and means extending through the end faces of the belt ends for connecting said post elements.

4. A belt joint comprising a pair of belt ends each having a tension element therein disposed in a loop closely adjacent the end face of the belt end, post elements disposed in said loops and wholly embedded in the belt ends, and means extending through the end faces of the belt ends and connecting said post elements, said means comprising plate elements integral with said post elements and means for detachably connecting said elements between the end faces of the belt ends.

5. A belt structure comprising a flexible body including rubber-like material and a reinforcement and having an end portion, a fastener element secured to said body at said end portion and anchored to said reinforcement, said fastener element being engageable with an element of another belt end by movement laterally of the belt, and means for locking said element against lateral movement with relation to another belt end, said fastener element and said locking means being of such dimensions as to be completely within the longitudinal faces of said body.

6. A belt joint comprising a pair of belt ends each having a tension element therein disposed in a loop closely adjacent the end faces of the belt end, post elements disposed in said loops and wholly embedded in the belt ends, a plurality of elements anchored to said post elements and extending through the end face of each belt end, and means for connecting the projecting elements of the two belt ends.

7. A belt joint as defined in claim 6 in which the elements projecting from each belt end comprise a pair of spaced-apart plate portions each having dove-tail means for engaging the corresponding plate portion of the other belt end.

8. A belt joint comprising a pair of V-belt ends each having a body of rubber-like material and a flexible tension structure, means within said belt ends engaging said tension structure and having laterally engageable elements projecting through the end faces of the belt ends, and means for connecting said elements against lateral movement, said elements and connecting means being disposed wholly within the side driving faces of the belt.

9. A belt joint comprising a pair of V-belt ends each having a body of rubber-like material and a tension element therein disposed in loop form closely adjacent the end face of the belt end, post elements disposed in said loops and wholly embedded in the belt ends, plate elements on said post elements and projecting through the end faces of the belt ends, dove-tail means for connecting the plate elements, and means for locking the connected plate elements against relative movement, the plate elements and locking means being disposed wholly within the side driving faces of the belt.

10. A belt connector comprising a pair of connector elements each having an anchoring portion adapted to be embedded in a belt end engageable with the material of the belt, portions integral with said anchoring portion and adapted to project from the end faces of the belt ends, and means for connecting the projecting portions of said elements.

11. A belt connector comprising a pair of connector elements each having a laterally extending post portion adapted to be embedded in a belt end crosswise thereof in engagement with the material of the belt and each belt having a pair of spaced-apart plate portions projecting from the post portion, and means for connecting the plate portions of said elements.

RUSSELL S. COLLEY.

CERTIFICATE OF CORRECTION.

Patent No. 2,251,400.  August 5, 1941.

RUSSELL S. COLLEY.

It is hereby certified that error appears in the printed specification of the above numbered patent requiring correction as follows: Page 2, second column, line 70, claim 11, for the words "each belt" read --each element--; and that the said Letters Patent should be read with this correction therein that the same may conform to the record of the case in the Patent Office.

Signed and sealed this 27th day of October, A. D. 1942.

(Seal)

Henry Van Arsdale,
Acting Commissioner of Patents.